United States Patent [19]

Cammarata, III et al.

[11] 4,105,730

[45] Aug. 8, 1978

[54] METHOD OF MAKING A FLEXIBLE, COLLAPSIBLE CONTAINER FOR LIQUIDS WITH IMPROVED TAIL SEAL

[75] Inventors: Frank Cammarata, III, Wheeling; Joe Alan Miller, Lake Zurich, both of Ill.; Jerry D. Martin, Kenosha, Wis.

[73] Assignee: Baxter Travenol Laboratories, Inc., Deerfield, Ill.

[21] Appl. No.: 648,603

[22] Filed: Jan. 12, 1976

[51] Int. Cl.² .............................................. B29C 17/07
[52] U.S. Cl. .......................................... 264/89; 264/98
[58] Field of Search ...................... 264/89, 90, 92, 94, 264/96–99, 327, 248; 425/DIG. 233, 387 B, 522, 525, 526, 530; 215/1 C, 100 A; 150/0.5

[56] References Cited

U.S. PATENT DOCUMENTS

| 3,505,440 | 4/1970 | Mason | 264/98 X |
|---|---|---|---|
| 3,564,087 | 2/1971 | Ruekberg | 264/98 X |
| 3,579,622 | 5/1971 | Shaw et al. | 264/99 |
| 3,761,550 | 9/1973 | Seefluth | 264/25 |
| 3,775,524 | 11/1973 | Seefluth | 264/98 X |
| 3,817,676 | 6/1974 | Seefluth | 425/DIG. 233 |
| 3,892,829 | 7/1975 | Uhlig | 264/89 |
| 4,010,783 | 3/1977 | Ralston | 150/1 |

*Primary Examiner*—Jan H. Silbaugh
*Attorney, Agent, or Firm*—Paul C. Flattery; John P. Kirby, Jr.; Gary W. McFarron

[57] ABSTRACT

A method of making a thin-walled tubular container. The container defines a head portion with access means to the contents of the container, and a tail portion defining a sealed line in the tail portion, joining sides of the container into a sealed end with a flat plastic piece being formed integral with the sealed line and extending away therefrom. In accordance with this invention, a pair of spaced rod members are formed as an integral part of the flat, plastic piece, the rod members extending transversely of the longitudinal axis of the container. The flat plastic piece also defines a portion thereof between the rod members which is thinner than any remainder of the plastic piece spaced from the rod members. Accordingly, the rod members and intermediate portion therebetween provide an improved and stronger tail seal.

10 Claims, 4 Drawing Figures

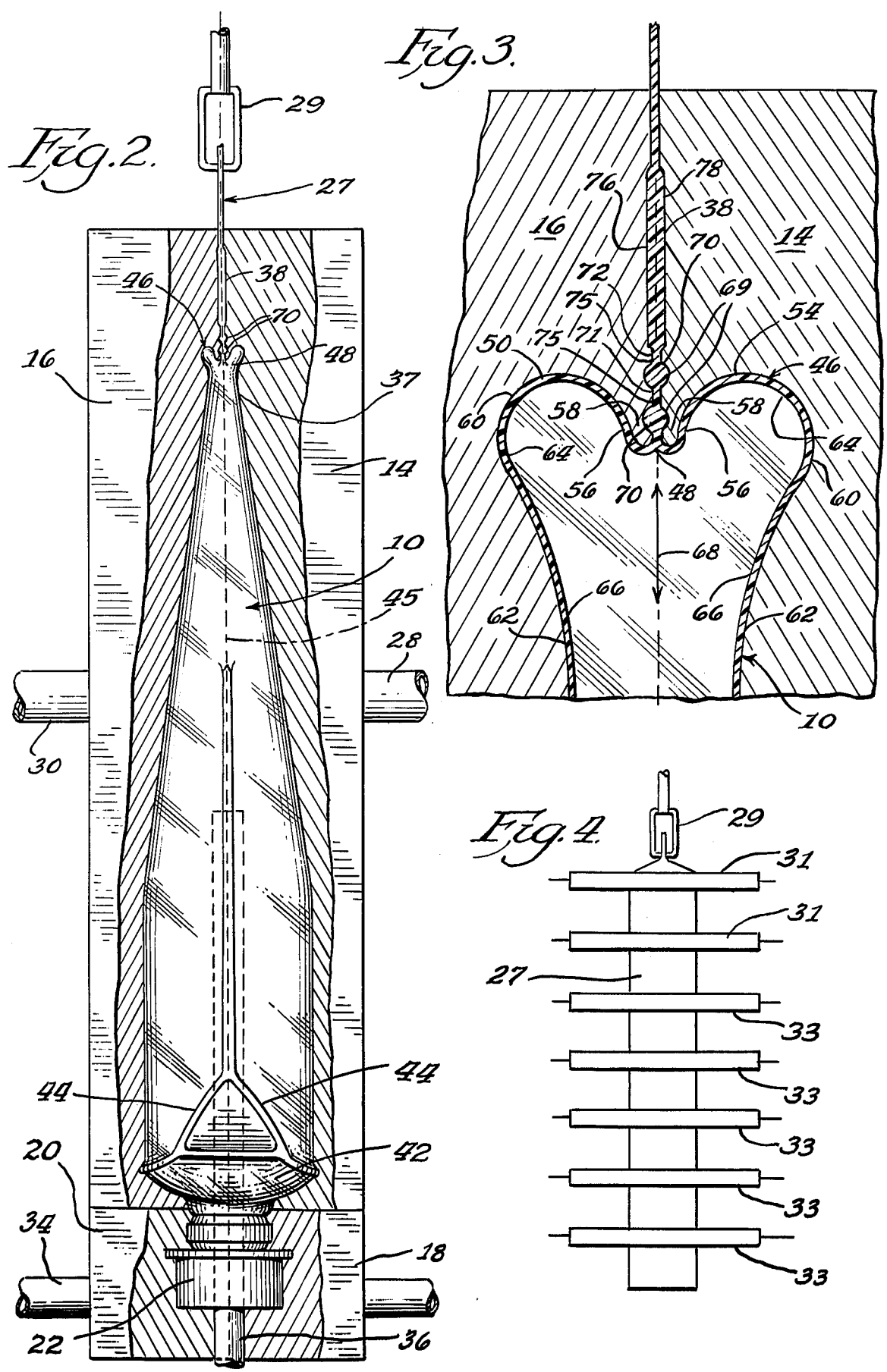

METHOD OF MAKING A FLEXIBLE, COLLAPSIBLE CONTAINER FOR LIQUIDS WITH IMPROVED TAIL SEAL

BACKGROUND OF THE INVENTION

Flexible, collapsible containers or bags made of plastic have achieved very significant commercial acceptance in the field of parenteral solution and blood bags. Initially, these items have been made from heat-sealed vinyl plastic sheets, and have been quite satisfactory. However, it has been recognized that significant costs can be saved by the use of other manufacturing procedures such as blow-molding and the like. Also, there has been consideration of the use of less expensive materials other than vinyl plastic in containers, particularly those materials that do not contain a plasticizer. For example, polypropylene has been considered a suitable candidate for use as a container material, when extruded as a thin, flexible sheet.

However, it has proven difficult to manufacture thin-walled plastic bags from polypropylene which are capable of collapsing, yet which are strong enough to stand rough handling without breaking. For example, when many filled, conventional designs of collapsible, blow-molded, polypropylene bags are dropped on the floor, they rupture along their tail seal line, which is the point at which the tubular plastic parison, from which the container is made by blow molding, is sealed together at its end.

Accordingly, there is a need for a stronger, thin-walled, collapsible container or bag for use in dispensing blood, parenteral solutions, or any other desired material, which can be made by a blow-molding process or another automated, cost-saving method, and which can be made from plasticizer-free materials such as polyethylene, polypropylene, or other similar plastic materials.

In accordance with this invention, an improved seal structure for plastic containers is disclosed, which may be used with either oriented or non-oriented plastic containers, and flexible or inflexible containers, resulting in a more reliable sealed end for such containers, especially for blow-molded, collapsible containers made from tubular plastic parisons.

DESCRIPTION OF THE INVENTION

In this invention, a hollow, tubular container includes a head portion with access means to the contents of the container, and a tail portion defining a sealed line in the tail portion, joining sides of the container into a sealed end. A flat plastic piece is formed integral with the sealed line, and extends away therefrom.

In accordance with this invention, a pair of spaced rod members are formed as an integral part of the flat plastic piece. The rod members extend transversely to the longitudinal axis of the container. The flat plastic piece also defines a portion thereof between the rod members which is thinner than the remainder of the plastic piece spaced from the rod members. Accordingly, the rod members and the intermediate portion therebetween provide an improved and stronger tail seal.

The mold which is used to prepare the container defines a pair of chamber-forming mold halves for defining a container body-forming portion. The mold typically also defines a head-forming portion at one end thereof, and tail portion defining means for sealing the container by forming a sealed line at the other end thereof, joining opposite sides of the container into a sealed end. The mold of this invention also, as part of the tail portion defining means, includes side-joining means for pressing a portion of the end of the softened plastic tube together into the flat plastic piece mentioned above.

The improved tail seal of this invention is accordingly produced by defining in the flat plastic piece-forming portions, of one or both of the mold halves, a pair of spaced channels, positioned transversely to the longitudinal axis of the mold halves and the container formed therein. Between the channels, a land area is defined in one or both of the mold halves which is higher than the remainder of the flat plastic piece-forming portion of the mold. Accordingly, the pressure of the closing mold is focused against the land area of the mold, positioned between the transverse channels.

As a result of this, the focused pressure produces, at the land area, a greatly increased pressure of a magnitude which could not be achieved by a similar, flat mold pressing uniformly against the entire flat plastic piece. Hence, the plastic walls of the collapsed tubular parison end are reduced in thickness adjacent the land area, with plastic being forced to flow in opposite directions, generally parallel to the longitudinal axis of the mold and container, away from the land area and into the spaced channels. As a result of this, a shearing flow is created in the two plastic layers of the collapsed tubular parison end, resulting in a substantial obliteration of the junction between the two plastic layers and forming a firm, integral union in the plastic that remains in the land area, as well as in the plastic that flows into the channels of the mold.

Hence, the resulting container assumes the configuration described above, having a pair of transversely-disposed rod members, with a thin portion between them. This particular structure, for the reasons described above, exhibits a firm plastic seal, and, since the lands and channels of the mold halves may extend across the entire width of the mold chamber, the resulting rod members and thin intermediate portion therebetween can likewise extend across the entire width of the container, forming a sealed tail portion of improved strength.

The remainder of the flat plastic piece of the tail portion will be held together by a weak seal or no seal at all, and can be removed if desired. Also, if desired, the container of this invention can be so molded as to avoid production of the flat plastic piece except for the rod members and the intermediate portion.

The above container is desirably made by selectively heating a tubular plastic parison so that one end of the plastic parison is hotter and softer than the remaining portion of the parison. Thereafter, the selectively heated parison is inflated in a blow mold chamber at relatively low inflation pressure. Accordingly, the hotter, softer portion of the parison balloons outwardly within the mold, beyond the remaining portions of the parison. The mold is closed, and the parison further inflated with relatively high pressure, to cause it to expand into the shape of the mold chamber.

As a result of this, the ballooned portions of the parison can exhibit less wall thickness than the other portions, and accordingly are more readily collapsible during use of the container.

The above method is particularly advantageous when, as is the case of the specific embodiment shown herein, the shape of the blow molded chamber adjacent the hotter, softer portion of the parison is relatively narrow in one dimension. In this instance, the ballooning action of the selectively heated parison facilitates the expansion of the parison to fit the shape of the mold chamber in the narrow section. In the absence of such ballooning prior to closing of the mold, the parison material in the vicinity of the narrow section of the blow mold chamber may come into contact with the mold walls, and accordingly cool prior to stretching completely into the narrow shape of the mold chamber, resulting in a defective container.

Referring to the drawings,

FIG. 2 is an elevational view of the same container, rotated 90°, and shown in conjunction with its mold, portions of the mold being broken away.

FIG. 3 is a highly-magnified, longitudinal sectional view, taken along line 3—3 of FIG. 1, showing in detail the structure of the sealed tail end portion of this invention.

FIG. 4 is a plan view of a parison section being heated by strip heaters prior to molding of the softened parison section as described herein.

Figure 1:
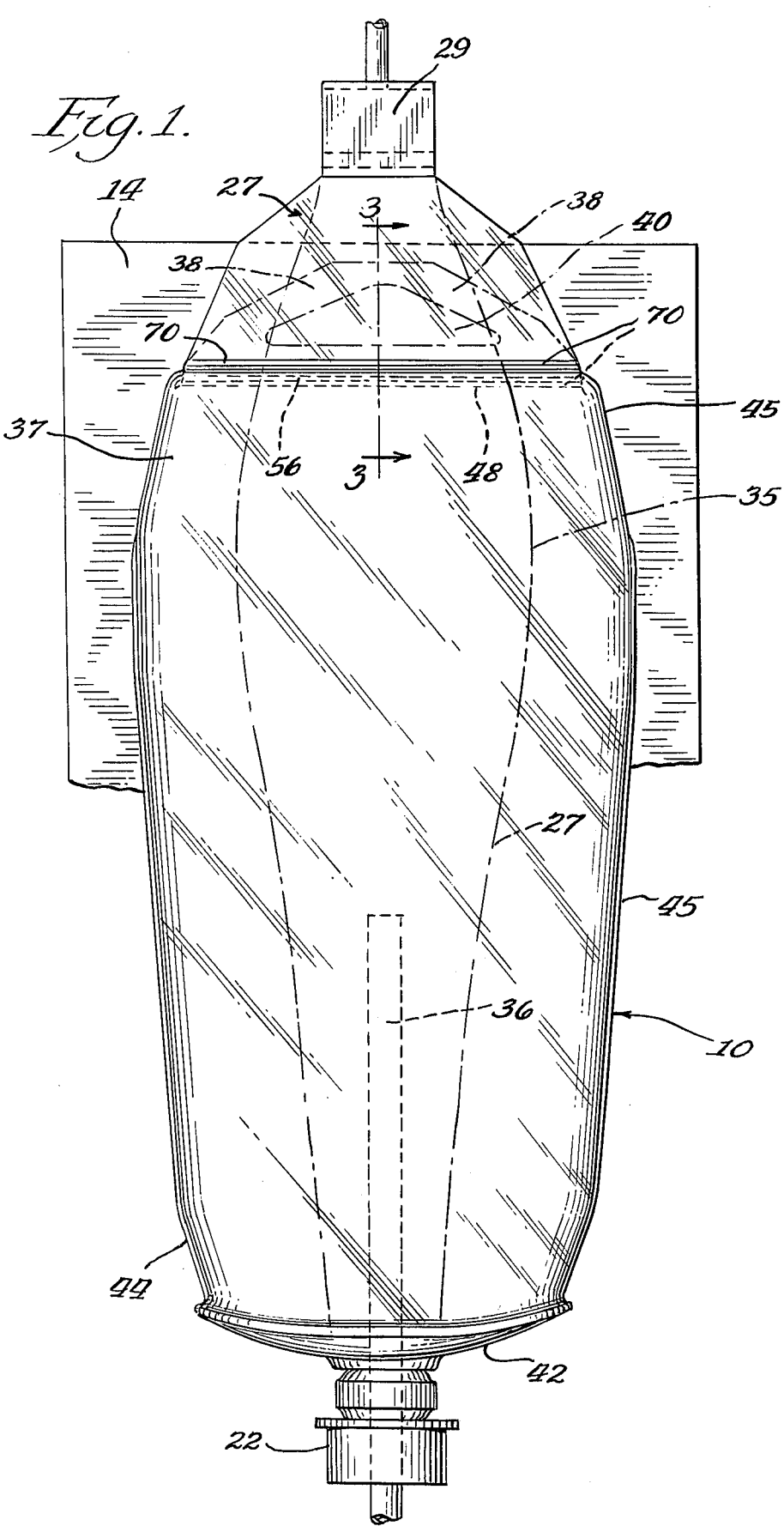
FIG. 1 is an elevational view of a flexible container made in accordance with this invention, with a portion of its mold shown, and with a preliminary stage of the shape of the container during molding being shown.

Referring to the drawings, flexible, collapsible container 10 is shown to be made from a heated tubular parison of softened polypropylene plastic or the like by a convention blow-molding process, involving body mold halves 14, 16 for forming the body of container 10, and head mold halves 18, 20 for forming the head portion 22 of the container. As shown in FIG. 2, the head portion 22 formed by mold halves 18, 20 is a relatively thick, rigid open tube, and defining a bore communicating with the interior of container 10.

Any conventional closure may be used to seal a container of this invention. For example, a molded plastic closure member can be sealed in place across the mouth of head portion 22, having puncturable diaphragms for access into the container. An overcap can also be attached after molding, for example an overcap similar to that disclosed in Weiler U.S. Pat. No. 3,730,372.

Blow-molding in general is a well-developed arm of technology, and many different techniques of blow-molding are currently available to those skilled in the art and which are usable for manufacturing the containers of this invention.

The particular blow-molding technique described below has been found to be particularly useful and advantageous in making containers of the design specified herein, although other blow-molding techniques can also be used.

Typically, a separately-extruded tubular parison section 27 is grasped by gripper 29 and placed between mold halves 14, 16 and head mold halves 18, 20. Blowing tube 36 is then placed into the parison from the bottom, and pressurized air at a pressure of about 8 p.s.i. is provided through the blowing tube, prior to or as mold halves 14, 16 close. A plug is mounted upon blow tube 36 to close neck portion 22 of the container 10 formed from the parison 27, so that, as the head molds 18, 20 close, the parison can be inflated to approximate the desired final structure.

As shown in FIG. 4, parison 27 may be typically selectively preheated with conventional parison strip heaters 31, 33. Strip heaters 31 are adjusted to produce a greater heat output than heaters 33.

Thus, parison 27 is heated to a higher temperature with respect to its upper third, when compared with the rest of the container, prior to closing of the mold. As a result, the upper third of parison 27 is somewhat softer. The exact heating conditions are empirical, and must be individually determined for the particular equipment used, to obtain the desired results on such equipment.

Accordingly, upon the 8 p.s.i. inflation, a preliminary bubble 35 is shown in FIG. 1 to be formed by ballooning outwardly in the parison 27, being illustrated in phantom lines. This is an intermediate configuration of the parison, prior to formation of the final configuration, which is container 10 as shown in the drawings in full lines.

It can be seen that preexpansion of the upper portion of parison 27 facilitates the complete filling of the narrow, upper end 37 of the mold (FIG. 2) by the softened, ballooned parison end, as the mold closes.

After formation of the intermediate configuration of parison 27 as shown in FIG. 1, and after closing of the mold halves 14, 16, 18 and 20, high pressure air is introduced to blowing tube 36 at a pressure of about 110 p.s.i., to cause the parison to assume the shape of the mold cavity, as shown in the drawings. Typically, during this phase of the operation, up to about a five ton total pressure can be applied against the mold halves to counterbalance the internal air pressure, while creating the novel tail seal described previously.

The walls of the upper third of the container of this invention, as shown in the drawings, are generally thinner than the walls of the lower two thirds, which provides the advantage of permitting a uniform collapse as the container is emptied of solution, beginning at the end having hanger piece 38, and slowly proceeding down the container as the liquid is removed through head portion 22. The difference in wall thickness changes gradually, typically ranging from about 0.01 inch at end 37 to 0.02 inch in the vicinity of shoulder portions 42.

After the inflation process is complete, and the newly-formed container has cooled sufficiently to retain its shape, the portion of parison 27 which projects upwardly out of the mold may be cut away, and the mold opened so that the container drops out. Thereafter, an appropriate closure can be placed upon head portion 22 of container 10.

If desired, head mold halves 18, 20 may close on parison 27 prior to the closing of mold halves 14, 16, to pre-form the head portion 22.

The present invention is particularly useful for sealing biaxially oriented containers. The process of biaxial orientation makes the formation of a good tail seal more difficult, due to cooling of the parison during the orientation process, but the present invention can be effectively utilized in that circumstance.

Flat plastic hanger piece 38 is made from an end section of the parison by molding as shown, to be formed integrally with container 10, and extending essentially the entire width of the container. An aperture 40 is generally provided in hanger piece 38, being generally formed during or after molding by cutting or the like, to facilitate hanging of the container in the position indicated in FIG. 1. Hanger piece 38 can also be shaped after molding by cutting into a shape as indicated in phantom lines in FIG. 1.

The container 10, in as-molded form, defines a shoulder portion 42 integral with head portion 22. The container also includes various gusset portions 44 defining certain lines of folding weakness, and longitudinal line of folding weakness 45, to facilitate the collapse of the bag in the manner illustrated in previously-filed United States application Ser. No. 526,092, filed Nov. 21, 1974. However, it is contemplated that the invention of this application can be utilized with any flexible plastic container.

Container 10 defines a tail end portion 46 which, in turn, defines a sealed line 48, joining opposite sides 50, 54 of tubular container 10 into a sealed end.

Sealed line 48 is formed by bringing the respective container walls 50, 54 together by mold halves 14, 16, and effecting a heat seal along line 48. As shown in FIG. 1, line 48 extends essentially the entire width of container 10.

Hanger piece 38 is formed in the parison 27 by the mold into a flat piece, adjacent its end. Hanger piece 38 is integral with sealed line 48 and extends away therefrom.

The sealed end of tail portion 46 of container 10 is molded to define a recess 56, formed by the container walls, which is directed inwardly to the interior of container 10 to form a bellows-like structure at the end of container 10 as shown in FIG. 3. Recess 56 extends the entire length of seal line 48, and serves as a protection means for it, reducing the likelihood that rupture will take place in the vicinity of seal line 48 upon exposure to shock generated by dropping of the filled container or the like.

Recess 56 is formed by protruding portions 58 of mold sections 14, 16, which result in the formation of recessed wall portions 56.

Mold halves 14, 16 also define relatively enlarged, semi-cylindrical chamber portions 60, relative to the mold chamber portions 62 immediately adjacent to portions 60, which also extend the length of seal line 48. The purpose of these relatively enlarged, semi-cylindrical chamber portions is to produce corresponding container wall portions 64, which are semi-cylindrical in cross-section, which serve as shock-absorbers for the sealed end of tail portion 46.

Flat plastic hanger piece 38 also defines a pair of spaced rods 70 which are integral with plastic piece 38, and extend the entire width of the container. Between rods 70 is an intermediate portion 71 of plastic piece 38, which is shown to be approximately one half the thickness of the remainder of flat plastic piece 38 which is spaced from rods 70. For example, the thickness of portion 71 can be about 0.01 to 0.02 inch and the outer portion of plastic piece 38 is about twice as thick.

This is accomplished by providing to each mold half 14, 16 land areas 75 positioned between transversely-extending channels 69 in registry with each other, each typically projecting outwardly relative to the remaining area 76 of the tail piece-forming portions of mold 14, 16 by at least about 0.005 inch, to cause the thinning of portion 71.

Accordingly, when mold halves 14, 16 are brought together to form flat piece 38 by collapsing the end of a tubular plastic parison, the majority of the entire compressive force exerted between the two mold halves by pistons 28, 30 is focused in land area 75 between transversely-extending channels 69. As a result, the plastic in land area 75 is placed under sufficient compression to force plastic to flow out of area 75 in the opposite directions as indicated by longitudinal axis 68, to fill the transversely extending channels 69 defined in mold halves 14, 16, resulting in the creation of rods 70. As stated above, the shearing action resulting from this flow substantially obliterates, in portion 71, the junction line 78 between opposite sides of the plastic parison. This results in a seal of improved strength in the area of rods 70 and thin portion 71.

A typical container of this invention may be proportioned to contain a liter of parenteral solution.

Generally a container of this invention may have an average wall thickness at the tail portion thereof of no more than about 0.05 inch, and particularly from around 0.01 to 0.02 inch, in order to obtain the most significant improvement in sealing over the sealing methods of the prior art. Accordingly, the flat plastic member at its outer portion, in the vicinity of reference numeral 78, may have a thickness of about 0.02 to 0.04 inch, for example 0.03 inch, while intermediate portions 71 between the rod members 69 may accordingly have a thickness of about 0.01 to 0.02 inch, e.g. 0.015 inch.

The distance of the strengthened tail seal portion from seal line 48 to upper portion 72 may be, for example 0.187 inch, with the remaining structure of FIG. 3 being of proportionate size.

When filled with a liquid, the container of this invention can be expected to assume shapes other than that ideally shown in the drawings, in which said container shown is in as-molded condition. The exact shape of the filled container will vary from moment to moment with handling and with its orientation to the vertical, since it is made of flexible material.

The above has been offered for illustrative purposes only, and is not to be considered as limiting the invention, which is as described in the claims below.

That which is claimed is:

1. The method of sealing the end of a heat-softened plastic tubular parison in a mold which results in a finished container having a wall thickness of no more than 0.05 inch adjacent the area to be sealed, which comprises closing said mold about said parison, collapsing the end of said tubular parison together across its entire width, whereby opposite sides of said parison combine to form a flat plastic piece; pressing a segment of said flat plastic piece with force sufficient to cause said plastic to flow; and causing said flowing plastic to move in opposite axial directions relative to the heat-softened plastic parison to form a pair of spaced rod members positioned in said plastic piece transversely to said axial directions and exending across the entire width of the resulting container, and to correspondingly cause the flat plastic piece between said rod members to be reduced in thickness, and blow molding said parison to form the container, whereby the resulting container exhibits a generally uniform wall thickness adjacent said flat plastic piece.

2. The method of claim 1 in which said heat-softened plastic parison is a biaxially oriented plastic material.

3. The method of claim 2 in which the portion of said flat plastic piece between said rod members which are formed is pressed to approximately one half of its original thickness.

4. The method of claim 1 in which said spaced rod members are formed in the flat plastic piece at a position substantially spaced from the end of said parison, whereby a flat plastic member is defined at the end of the container formed from the parison suitable for use as a container hanger member.

5. The method of claim 1 in which the wall thickness of the resulting container adjacent said flat plastic piece is from 0.01 to 0.02 inch.

6. The method of molding a softened, plastic tubular parison which comprises selectively heating an entire circumferential portion of said plastic parison so that said portion of the plastic parison is hotter and softer than the remaining portions of said parison; inflating said plastic parison in a blow mold chamber at relatively low inflation pressure, whereby the hotter, softer portion of said parison balloons outwardly relative to the remaining portions of the parison, within said mold, the shape of said blow mold chamber adjacent said hotter, softer portion of the parison being relatively narrow in one transverse dimension; thereafter closing said mold whereby said relatively narrow portion of the blow mold chamber engages said ballooned portion of the parison upon closing, to cause it to collapse in one transverse dimension and to expand in another transverse dimension to assume the general shape, with relatively little stretching, of said adjacent, narrow blow mold chamber portion; and inflating said parison with relatively high pressure after said mold is closed to cause said parison to completely expand into the shape of the mold chamber, whereby the ballooned portions of said parison exhibit less wall thickness than said other portions.

7. The method of claim 6 in which the ballooned end of the parison in said mold chamber is collapsed together whereby opposite sides of said ballooned parison combine to form a flat, plastic piece; and thereafter pressing a segment of said flat plastic piece extending across the entire width of the resulting container with force sufficient to cause said plastic to flow; and causing said flowing plastic to move in opposite axial directions relative to said heat softened plastic parison, to form a pair of spaced rod members positioned in said plastic piece transversely to said axial directions, and to correspondingly cause the flat plastic piece between said rod members to be reduced in thickness.

8. The method of claim 7 in which said heat-softened plastic parison is a biaxially oriented plastic material.

9. The method of claim 8 in which the portion of said flat plastic piece between said rod members which are formed is pressed to approximately one half of its original thickness.

10. The method of claim 7 in which said spaced rod members are formed in the flat plastic piece at a position substantially spaced from the end of said parison, whereby a flat plastic member is defined at the end of the container formed from the parison, suitable for use as a container hanger member.

* * * * *